US012777551B2

(12) United States Patent
Zhang et al.

(10) Patent No.: US 12,777,551 B2
(45) Date of Patent: Oct. 27, 2026

(54) METHOD AND DEVICE USED FOR RECEIVING MULTICAST AND BROADCAST SERVICES IN WIRELESS COMMUNICATION

(71) Applicant: Apogee 5G Global, LLC, Plano, TX (US)

(72) Inventors: Jinfang Zhang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 257 days.

(21) Appl. No.: 18/379,673

(22) Filed: Oct. 13, 2023

(65) Prior Publication Data

US 2024/0147569 A1 May 2, 2024

(30) Foreign Application Priority Data

Oct. 26, 2022 (CN) ......................... 202211315816.4

(51) Int. Cl.
*H04W 4/00* (2018.01)
*H04W 72/542* (2023.01)
*H04W 76/27* (2018.01)

(52) U.S. Cl.
CPC ......... *H04W 76/27* (2018.02); *H04W 72/542* (2023.01)

(58) Field of Classification Search
USPC .................................................. 370/329, 330
See application file for complete search history.

(56) References Cited

U.S. PATENT DOCUMENTS 11,811,691 B1 * 11/2023 Babaei .................. H04W 72/30
2015/0009815 A1 * 1/2015 Hsu ....................... H04W 76/28 370/230.1
2022/0312318 A1 * 9/2022 Babaei .............. H04W 52/0229
2023/0276429 A1 * 8/2023 Miao ..................... H04L 5/0053 370/329
2024/0023142 A1 * 1/2024 Zhang ..................... H04W 4/50
2024/0365349 A1 * 10/2024 Narayanan Thangaraj ................. H04W 4/06
2025/0220762 A1 * 7/2025 Dai ..................... H04W 68/005
2025/0331061 A1 * 10/2025 Liu ....................... H04W 76/40

(Continued)

OTHER PUBLICATIONS

Third Generation Partnership Project, "Technical Specification Group Radio Access Network; NR; Physical layer procedures for data (Release 17)," 3GPP TS 38.214 V17.3.0 (Sep. 2022).

(Continued)

*Primary Examiner* — Chuong T Ho
(74) *Attorney, Agent, or Firm* — Volpe Koenig

(57) ABSTRACT

Discloses a method and a device for wireless communications. A first node receives a first message in RRC_Inactive state, the first message indicating a first MBS session; and as a response to receiving the first message, enters into a first RRC state; receives at least one radio signal in the first RRC state, of which each radio signal comprising a data unit of the first MBS session; herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state. The present application supports MBS reception.

18 Claims, 6 Drawing Sheets

(56) References Cited

U.S. PATENT DOCUMENTS

2026/0025641 A1 * 1/2026 Chen ....................... H04W 4/06

OTHER PUBLICATIONS

Third Generation Partnership Project, "Technical Specification Group Radio Access Network; NR; Radio Resource Control (RRC) protocol specification (Release 17)," 3GPP TS 38.331 V17.2.0 (Sep. 2022).

* cited by examiner

```
PagingGroupList::= SEQUENCE
(SIZE(1..maxNrofPageGroup)) OF PagingGroupRecord

PagingGroupRecord::=SEQUENCE{
   group-Identity        TMGI,
   rsrp-thresholdMBS   RSRP-Range      OPTIONAL,
   ...
}
```

METHOD AND DEVICE USED FOR RECEIVING MULTICAST AND BROADCAST SERVICES IN WIRELESS COMMUNICATION

CROSS REFERENCE TO RELATED APPLICATIONS

This application claims the priority benefit of Chinese Patent Application No. 202211315816.4, filed on Oct. 26, 2022, the full disclosure of which is incorporated herein by reference.

BACKGROUND

Technical Field

The present application relates to a method and a device used in wireless communication systems, and in particular to a method and device of receiving MBS services in wireless communications.

Related Art

The feature of multicast/broadcast transmission is not supported in the earliest version(s) of the fifth Generation (5G), that is, the Rel 15 and Rel 16, but in many significant application scenarios, such as public safety and mission critical, the application of Vehicle-to-Everything (V2X), software delivery and group communications, the one-to-many transmission feature of multicast/broadcast communications can enhance the system performance and user experience in a striking way. For better support to multicast/broadcast communications, a round of discussions on 5G broadcast evolution have been made between the 3rd Generation Partner Project (3GPP) Radio Access Network (RAN) #78 Plenary and RAN #80 Plenary, and a Study Item (SI) of the architecture evolution of 5G broadcast services is approved by the Service and System Aspects (SA) #85 session. To support reliable transmission of multicast/broadcast service (MBS), the 3GPP has conducted studies in Rel-17 on MBS transmissions in RRC_CONNECTED state. Since MBS traffics are mainly targeted at massive receiving users, in order to support MBS traffics effectively faced with network congestion and in the meantime reduce power consumption of a User Equipment (UE), the 3GPP started discussions over the support for MBS in RRC_INACTIVE state in Rel-18. The RRC_INACTIVE state is a new radio resource control (RRC) state introduced in New Radio (NR). When a UE enters into RRC_Inactive state, the user can retain part of network configuration information.

SUMMARY

Inventors find through researches that upon reception of a message that activates MBS traffics in RRC_Inactive state, if a great number of UEs enter into RRC_Connected state simultaneously to receive the MBS traffics, it is likely that the network congestion will occur, so how to make some of the UEs enter into RRC_Connected state and the others maintain RRC_Inactive state for receiving MBS traffics shall be studied.

The present application provides a solution, namely, when a message that activates MBS traffics is received, any UE in the RRC_Inactive state determines according to channel quality whether it shall enter into RRC_Connected state or maintain RRC_Inactive state to receive MBS traffics, thus this present application can reduce the risk of network congestion, potential network signaling storm as well as energy consumption of the UE with the traffic quality being kept consistent. Though originally targeted at a Uu air interface, the present application is also applicable to a PC5 air interface. Further, the present application is designed targeting terminal-base station scenario, but can be extended to Vehicle-to-Everything (V2X), terminal-relay communications, as well as relay-base station communications, where similar technical effects can be achieved. Additionally, the adoption of a unified solution for various scenarios, including but not limited to uplink communications, contributes to the reduction of hardcore complexity and costs. In the case of no conflict, the embodiments of a first node and the characteristics in the embodiments may be applied to any other node, and vice versa. What's more, the embodiments in the present application and the characteristics in the embodiments can be arbitrarily combined if there is no conflict. Particularly, for interpretations of the terminology, nouns, functions and variables (unless otherwise specified) in the present application, refer to definitions given in TS36 series, TS38 series and TS37 series of 3GPP specifications.

The present application provides a method in a first node for wireless communications, comprising:

receiving a first message in RRC_Inactive state, the first message indicating a first MBS session, the first node having joined the first MBS session; and as a response to receiving the first message, entering into a first RRC state from RRC_Inactive state; and receiving at least one radio signal in the first RRC state, of the at least one radio signal each radio signal comprising a data unit of the first MBS session;

herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped.

In one embodiment, the above method is applicable to multicast MBS services.

In one embodiment, the above method is applicable to a Point-to-Multipoint (PTM) transmission mode.

In one embodiment, the above method is applicable to scenarios in which the at least one radio signal is received by a UE in RRC_Connected state and a UE in RRC_Inactive state simultaneously.

In one embodiment, the above method can effectively decrease the risk of network congestion by supporting a first RRC state to be RRC_Connected state or RRC_Inactive state.

In one embodiment, the above method can effectively prevent signaling storm by supporting a first RRC state to be RRC_Connected state or RRC_Inactive state.

In one embodiment, the above method can effectively support synchronous receptions by many UEs by supporting a first RRC state to be RRC_Connected state or RRC_Inactive state.

In one embodiment, relating a first RRC state to the channel quality of a first cell in the method above can provide consistent user experience.

In one embodiment, the method above provides the UE reception flexibility.

In one embodiment, the method above supports the reception in RRC_Inactive state, which can reduce the energy consumption of the UE.

According to one aspect of the present application, comprising:

the phrase that whether the first RRC state is RRC_Connected state or RRC_Inactive state is related to whether there is an available configuration for the first MBS session comprises that: when the configuration for the first MBS session is not available, the first RRC state is RRC_Connected state; when the configuration for the first MBS session is available, the first RRC state is RRC_Inactive state.

In one embodiment, the method above supports the reception in RRC_Inactive state, which can reduce the energy consumption of the UE.

In one embodiment, when the channel quality of the first cell is better than the first threshold, and the configuration for the first MBS session is not available, the first node receives the at least one radio signal after entering into RRC_Connected state; and before receiving the at least one radio signal, receives the configuration for the first MBS session.

In one embodiment, the above method can be used for acquiring the configuration for the first MBS session by entering into RRC_Connected state, thus receiving the at least one radio signal.

According to one aspect of the present application, comprising:

when the configuration for the first MBS session is available, the first RRC state being RRC_Inactive state is fulfilled only when a first radio signal is monitored in a first time window;

herein, the first radio signal indicates the first MBS session; a start of the first time window is later than a reception of the first message.

In one embodiment, the method above ensures the reception in RRC_Inactive state, hence the provision of good user experience.

In one embodiment, the first time window is related to service features.

According to one aspect of the present application, comprising:

when the configuration for the first MBS session is available, and the first radio signal is not monitored in the first time window, the first RRC state is RRC_Connected state.

In one embodiment, the method above can effectively avoid the reception failure caused by a sudden change of channel quality.

In one embodiment, the method above can effectively avoid the reception failure caused by unavailable updated configuration for a first MBS session.

According to one aspect of the present application, comprising:

a length of the first time window is network-configured, or the length of the first time window is determined by the first node itself.

According to one aspect of the present application, comprising:

the first message indicating the first threshold.

In one embodiment, the first threshold is variable.

In one embodiment, with the method above the base station can indicate a first threshold according to how serious the network congestion is, thus controlling the number of user(s) that enters/enter into RRC_Connected state.

In one embodiment, the method above avoids network congestion while guaranteeing the Quality of Service (QoS).

According to one aspect of the present application, comprising:

receiving a second message, the second message indicating the configuration for the first MBS session; herein, the configuration for the first MBS session comprises at least one of a multicast Radio Network Temporary Identity (RNTI), a DRX configuration or a semi-persistent scheduling configuration.

The present application provides a method in a second node for wireless communications, comprising:

transmitting a first message, the first message indicating a first MBS session; and transmitting at least one radio signal, of the at least one radio signal each radio signal comprising a data unit of the first MBS session;

herein, a first node is in RRC_Inactive state, and the first node has joined the first MBS session; upon a reception of the first message, the first node enters into a first RRC state from RRC_Inactive state, and receives the at least one radio signal in the first RRC state; the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped, and the second node is a maintenance base station for the first cell.

According to one aspect of the present application, comprising:

the phrase that whether the first RRC state is RRC_Connected state or RRC_Inactive state is related to whether there is an available configuration for the first MBS session comprises that: when the configuration for the first MBS session is not available, the first RRC state is RRC_Connected state; when the configuration for the first MBS session is available, the first RRC state is RRC_Inactive state.

According to one aspect of the present application, comprising:

when the configuration for the first MBS session is available, the first RRC state being RRC_Inactive state is fulfilled only when a first radio signal is monitored in a first time window;

herein, the first radio signal indicates the first MBS session; a start of the first time window is later than a reception of the first message.

According to one aspect of the present application, comprising:

when the configuration for the first MBS session is available, and the first radio signal is not monitored in the first time window, the first RRC state is RRC_Connected state.

According to one aspect of the present application, comprising:

a length of the first time window is network-configured, or the length of the first time window is determined by the first node itself.

According to one aspect of the present application, comprising:

the first message indicating the first threshold.

According to one aspect of the present application, comprising:

transmitting a second message, the second message indicating the configuration for the first MBS session; herein, the configuration for the first MBS session comprises at least one of a multicast Radio Network Temporary Identity (RNTI), a DRX configuration or a semi-persistent scheduling configuration.

The present application provides a first node for wireless communications, comprising:

a first receiver, receiving a first message in RRC_Inactive state, the first message indicating a first MBS session, the first node having joined the first MBS session; and a first processor, as a response to receiving the first message, entering into a first RRC state from RRC_Inactive state;

the first receiver, receiving at least one radio signal in the first RRC state, of the at least one radio signal each radio signal comprising a data unit of the first MBS session;

herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped.

The present application provides a second node for wireless communications, comprising:

a first transmitter, transmitting a first message, the first message indicating a first MBS session; and transmitting at least one radio signal, of the at least one radio signal each radio signal comprising a data unit of the first MBS session;

herein, a first node is in RRC_Inactive state, and the first node has joined the first MBS session; upon a reception of the first message, the first node enters into a first RRC state from RRC_Inactive state, and receives the at least one radio signal in the first RRC state; the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped, and the second node is a maintenance base station for the first cell.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
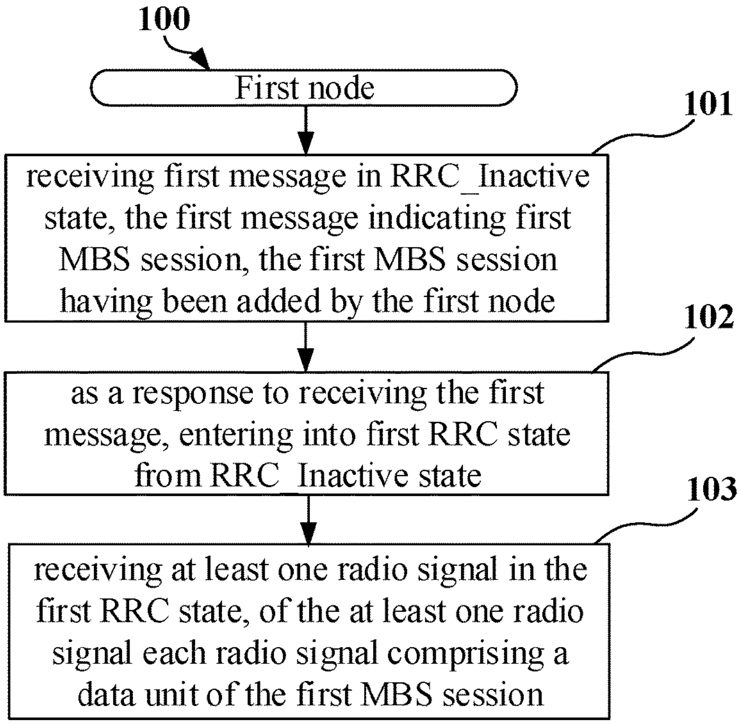
FIG. 1 illustrates a flowchart of transmission of a first node according to one embodiment of the present application.

Embodiment 1 illustrates a flowchart of transmission of a first node according to one embodiment of the present application, as shown in FIG. 1.

In Embodiment 1, a first node 100 receives a first message in RRC_Inactive state in step 101, the first message indicating a first MBS session, the first node having joined the first MBS session; and in step 102, as a response to receiving the first message, enters into a first RRC state from RRC_Inactive state; and in step 103, receives at least one radio signal in the first RRC state, of the at least one radio signal each radio signal comprising a data unit of the first MBS session; herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped.

In one embodiment, a first message is received through an air interface.

In one embodiment, the air interface is a Uu air interface.

In one embodiment, the air interface is a PC5 air interface.

In one embodiment, when receiving the first message the first node is in RRC_Inactive state.

In one embodiment, the first message is transmitted in a broadcasting mode.

In one embodiment, the first message is a paging message.

In one subembodiment, the first message is received in a paging occasion of the first node.

In one embodiment, the first message is a RAN paging message.

In one embodiment, the first message is a core network (CN) paging message.

In one embodiment, when receiving the first message, the first node is in RRC_Inactive state and in a Small Data Transmission (SDT) procedure.

In one embodiment, the first message is transmitted in a unicasting mode.

In one embodiment, the first message is a Downlink Control Information (DCI) message.

In one embodiment, the first message is a Medium Access Control (MAC) Control Element (CE).

In one subembodiment of the above three embodiments, when receiving the first message the first node is in RRC_Inactive state and in a SDT procedure, where the configuration for the first MBS session is for the first cell.

In one embodiment, the first message explicitly indicates a first MBS session.

In one embodiment, the first message implicitly indicates a first MBS session.

In one embodiment, the phrase that the first message indicates a first MBS session comprises that: the first message comprises a first identifier, the first identifier indicating the first MBS session.

In one embodiment, the first identifier is a Temporary Mobile Group Identity (TMGI), the TMGI indicating the first MBS session.

In one subembodiment, the first message is a paging message.

In one embodiment, the first identifier is a Semi-Persistent Scheduling (SPS) configuration index, where a semi-persistent scheduling configuration indicated by the SPS configuration index is used for the first MBS session.

In one embodiment, the first identifier is an MBS Radio Bearer (MRB) identifier, the MRB identifier being used for the first MBS session.

In one subembodiment of the above two embodiments, when receiving the first message the first node is in RRC_Inactive state and in a SDT procedure.

In one embodiment, when the first message is a paging message, the first node delivers the first identifier to an upper layer.

In one embodiment, the upper layer is a Non-access stratum (NAS).

In one embodiment, the upper layer is an MBS application layer.

In one embodiment, the first node has joined the first MBS session.

In one embodiment, the phrase that the first node has joined the first MBS session comprises that: the first node has an available configuration for the first MBS session.

In one embodiment, the phrase that the first node has joined the first MBS session comprises that: the first node has stored a configuration for the first MBS session.

In one embodiment, the phrase that the first node has joined the first MBS session comprises that: the first node can obtain an available configuration for the first MBS session.

In one embodiment, the phrase that the first node has joined the first MBS session comprises that: when the first MBS session starts, the first node can receive a data unit of the first MBS session.

In one embodiment, the first node does not add any MBS session other than the first MBS session indicated by the first message.

In one embodiment, the first message does not indicate any MBS session other than the first MBS session.

In one embodiment, the first MBS session is any MBS session indicated by the first message.

In one embodiment, the first MBS session is any MBS session added by the first node.

In one embodiment, the first message is used for activating the first MBS session.

In one embodiment, before receiving the first message, the first MBS session is deactivated.

In one embodiment, before receiving the first message, the first MBS session is not started.

In one embodiment, when the first identifier is a semi-persistent scheduling (SPS) configuration index, the first message is used for activating the semi-persistent scheduling.

In one embodiment, when the first identifier is an MRB identifier, the first message is used for activating the MRB.

In one embodiment, when the first message is a paging message, the first message does not comprise an identifier of the first node.

In one embodiment, the identifier of the first node indicates the first node.

In one embodiment, the identifier of the first node is assigned by an upper layer.

In one embodiment, the identifier of the first node is a full-RNTI.

In one embodiment, the identifier of the first node is an I-RNTI.

In one embodiment, as a response to receiving the first message, entering into a first RRC state from RRC_Inactive state.

In one embodiment, the first RRC state is one of RRC_Connected state or RRC_Inactive state.

In one embodiment, entering into a first RRC state from the RRC_Inactive state comprises: initiating an RRC connection resume procedure in RRC_Inactive state to enter into RRC_Connected state; herein, the first RRC state is RRC_Connected state.

In one embodiment, entering into a first RRC state from the RRC_Inactive state comprises: maintaining RRC_Inactive state; herein, the first RRC state is RRC_Inactive state.

In one embodiment, at least one radio signal is received in the first RRC state, of the at least one radio signal each radio signal comprising a data unit of the first MBS session.

In one embodiment, the phrase "of the at least one radio signal each radio signal comprising a data unit of the first MBS session" comprises that: each radio signal of the at least one radio signal comprises a data unit of an MRB, the MRB being associated with the first MBS session.

In one embodiment, the MRB is a multicast MRB.

In one embodiment, the MRB is used for configuring a transmission of a data unit of the first MBS session in a multicast mode.

In one embodiment, the MRB is not a broadcast MRB.

In one embodiment, the phrase "of the at least one radio signal each radio signal comprising a data unit of the first MBS session" comprises that: each radio signal of the at least one radio signal comprises a data unit of a first logical channel, the first logical channel serving an MRB, the MRB being associated with the first MBS session.

In one embodiment, the data unit is a Service Data Unit (SDU).

In one embodiment, the at least one radio signal is transmitted in a multicast mode.

In one embodiment, whether the first RRC state is RRC_Connected state or RRC_Inactive state is related to at least channel quality of a first cell.

In one embodiment, the first processor determines whether the first RRC state is RRC_Connected state or RRC_Inactive state at least according to channel quality of a first cell.

In one embodiment, at least the channel quality of a first cell is used to determine whether the first RRC state is RRC_Connected state or RRC_Inactive state.

In one embodiment, whether the first RRC state is RRC_Connected state or RRC_Inactive state is related to whether there is an available configuration for each MBS session having been joined by the first node that is indicated by the first message.

In one embodiment, the channel quality of the first cell is obtained by a measurement of the first cell.

In one embodiment, the measurement also comprises post-measurement processing, the processing including a L3 filter and other commonly used filters, which are not to be listed here one by one.

In one embodiment, channel quality of the first cell is a Reference Signal Received Power (RSRP) measured for the first cell.

In one embodiment, channel quality of the first cell is a Reference Signal Received Quality (RSRQ) measured for the first cell.

In one embodiment, channel quality of the first cell is a reference signal signal-to-noise and interference ratio (RS-SINR) measured for the first cell.

In one embodiment, a measurement of the first cell includes a measurement of a reference signal transmitted in the first cell.

In one embodiment, a measurement of the first cell includes a measurement of a Physical Broadcast Channel (PBCH) transmitted in the first cell.

In one embodiment, a measurement of the first cell includes a measurement of a SS/PBCH block (SSB) transmitted in the first cell.

In one subembodiment, the SSB is indicated in the configuration for the first MBS session.

In one subembodiment, the SSB is associated with at least one radio signal; herein, data unit(s) comprised by the at least one radio signal belongs/belong to the first MBS session.

In one embodiment, the phrase that the SSB is associated with at least one radio signal comprises that: multi-antenna Rx parameters of the SSB are identical to multi-antenna Rx parameters of the at least one radio signal.

In one embodiment, the phrase that the SSB is associated with at least one radio signal comprises that: multi-antenna Rx parameters of the at least one radio signal can be used for inferring multi-antenna Rx parameters of the SSB.

In one embodiment, the phrase that the SSB is associated with at least one radio signal comprises that: reception of the at least one radio signal is used to determine multi-antenna Rx parameters of the SSB.

In one embodiment, the multi-antenna Rx parameters include a spatial domain filter.

In one embodiment, the multi-antenna Rx parameters include a Spatial Relation parameter.

In one embodiment, the multi-antenna Rx parameters include a Quasi-CoLocation (QCL) parameter.

In one embodiment, the specific definition of the QCL parameter can be found in 3GPP TS38.214, section 5.1.5.

In one embodiment, when the channel quality of the first cell is worse than a first threshold, the first RRC state is RRC_Connected state.

In one embodiment, when the channel quality of the first cell is smaller than the first threshold, the channel quality of the first cell is worse than the first threshold.

In one embodiment, when the channel quality of the first cell is equal to the first threshold, the channel quality of the first cell is worse than the first threshold.

In one embodiment, the first threshold is pre-configured.

In one embodiment, the first threshold is fixed.

In one embodiment, the first threshold is variable.

In one embodiment, the first threshold is determined by the UE itself.

In one embodiment, the first threshold is configured through a system message.

In one embodiment, the first threshold is configured through a System Information Block (SIB).

In one embodiment, a name of the first threshold includes rsrp-Threshold.

In one embodiment, a name of the first threshold includes rsrq-Threshold.

In one embodiment, a name of the first threshold includes rs-SINR-Threshold.

In one embodiment, a name of the first threshold is MBS-rsrp-Threshold.

In one embodiment, a name of the first threshold is rsrp-ThresholdMBS.

In one embodiment, a name of the first threshold is multicastMBS-rsrp-Threshold.

In one embodiment, when the channel quality of the first cell is better than the first threshold, whether the first RRC state is RRC_Connected state or RRC_Inactive state is related to whether a configuration for the first MBS session is available.

In one embodiment, the first processor determines whether the first RRC state is RRC_Connected state or RRC_Inactive state according to whether a configuration for the first MBS session is available when the channel quality of the first cell is better than the first threshold.

In one embodiment, when the channel quality of the first cell is better than the first threshold, whether a configuration for the first MBS session is available is used to determine whether the first RRC state is RRC_Connected state or RRC_Inactive state.

In one embodiment, when the channel quality of the first cell is greater than the first threshold, the channel quality of the first cell is better than the first threshold.

In one embodiment, when the channel quality of the first cell is equal to the first threshold, the channel quality of the first cell is better than the first threshold.

In one embodiment, the phrase of whether there is an available configuration for the first MB S session comprises: whether the configuration for the first MBS session is stored.

In one embodiment, the phrase of whether there is an available configuration for the first MBS session comprises: whether an updated configuration for the first MBS session is available.

In one embodiment, the phrase of whether there is an available configuration for the first MB S session comprises: whether the configuration for the first MBS session is updated; when no signaling that indicates an update of the configuration for the first MBS session is received, or, when a signaling that indicates an update of the configuration for the first MBS session is received and the configuration for the first MBS session is updated according to the signaling, there is an available configuration for the first MBS session; when a signaling that indicates an update of the configuration for the first MBS session is received but the configuration for the first MBS session is not updated according to the signaling, there is no available configuration for the first MBS session.

In one embodiment, the first cell is a cell on which the first node is currently camped.

In one embodiment, the cell on which the first node is currently camped includes: a suitable cell of the first node.

In one embodiment, the cell on which the first node is currently camped includes: an acceptable cell of the first node.

In one embodiment, the cell on which the first node is currently camped includes: a serving cell of the first node.

In one embodiment, the first cell is a cell providing a configuration for the first MBS session.

In one embodiment, the configuration for the first MBS session is applicable to the first cell.

In one embodiment, a maintenance base station for the first cell is a second node in the present application.

In one embodiment, a Transmit/Receive Point (TRP) of the first cell is a second node in the present application.

In one embodiment, the first cell comprises an area served by the second node in the present application.

In one embodiment, the first cell comprises an area covered by the second node in the present application.

Embodiment 2

Figure 2:
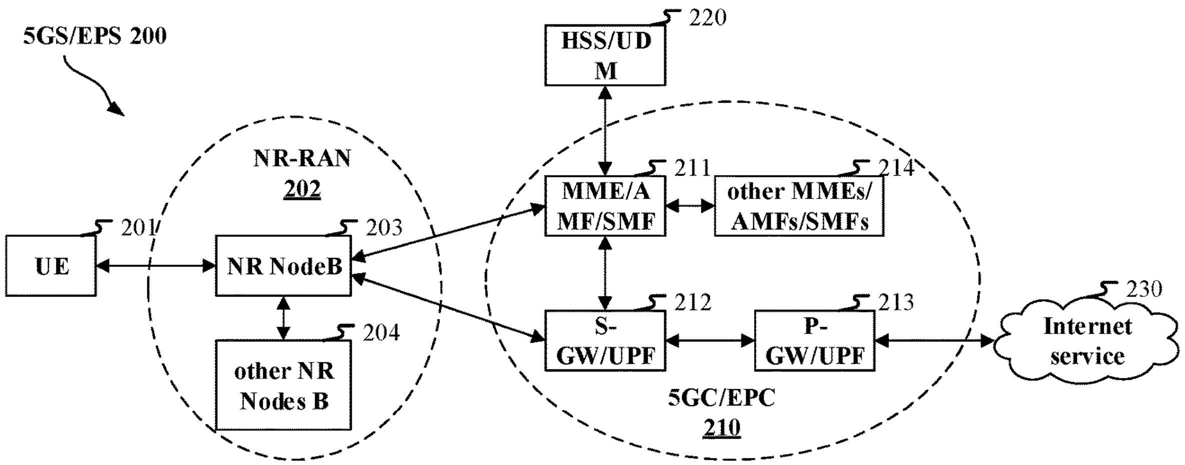
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 illustrates a network architecture 200 of NR 5G, Long-Term Evolution (LTE), and Long-Term Evolution Advanced (LTE-A) systems. The NR 5G or LTE, or LTE-A network architecture 200 may be called a 5G System/Evolved Packet System (5GS/EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The XnAP protocol at the Xn interface is used for transmitting messages of the control plane of the wireless network, while the user-plane protocol at the Xn interface is used for transmitting data of the user plane. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 can be a satellite, an aircraft or a terrestrial base station relayed through the satellite. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communication units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE 201 corresponds to a first node in the present application.

In one embodiment, the gNB203 corresponds to a second node in the present application.

In one embodiment, the UE 201 is a User Equipment (UE).

In one embodiment, the UE 201 is a relay device.

In one embodiment, the UE 201 is a RoadSide Unit (RSU).

In one embodiment, the gNB203 is a Macro Cell base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large time-delay difference.

In one embodiment, the gNB203 is a flight platform.

In one embodiment, the gNB203 is satellite equipment.

In one embodiment, the gNB203 is a base station supporting large time-delay difference.

In one embodiment, the gNB203 is a piece of test equipment (e.g., a transceiving device simulating partial functions of the base station, or a signaling test instrument).

In one embodiment, a radio link from the UE201 to the gNB203 is an uplink, the uplink being used for performing uplink transmission.

In one embodiment, a radio link from the gNB203 to the UE201 is a downlink, the downlink being used for performing downlink transmission.

In one embodiment, the UE201 and the gNB203 are connected by a Uu interface.

Embodiment 3

Figure 3:
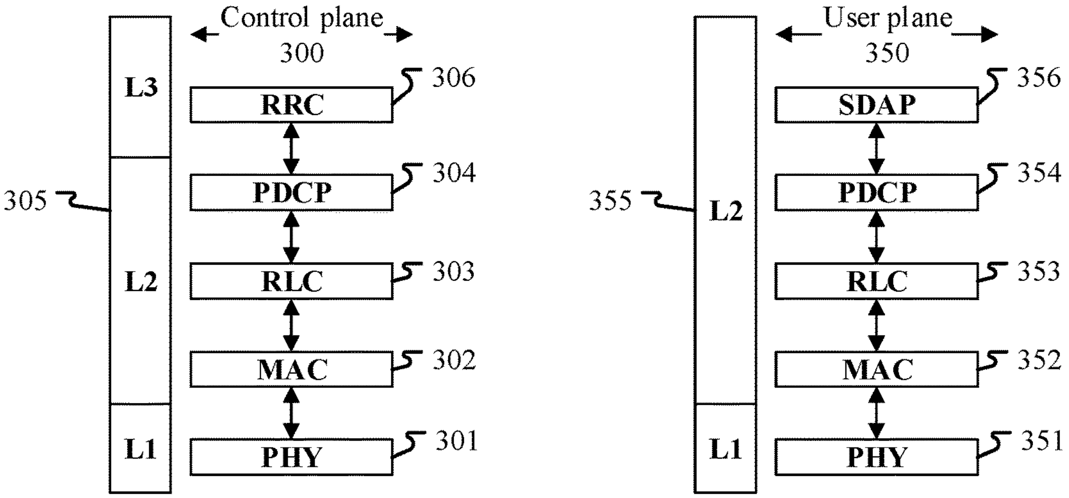
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 of a UE and a gNB is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the UE and the gNB via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection, and also support for handover of a UE between gNBs. The RLC sublayer 303 provides segmentation and reassembling of a packet, retransmission of a lost packet through an Automatic Repeat Request (ARQ), and detection of duplicate packets and protocol errors. The MAC sublayer 302 provides mappings between a logical channel and a transport channel as well as multiplexing of logical channels. The MAC sublayer 302 is also responsible for allocating between UEs various radio resources (i.e., resource block) in a cell. The MAC sublayer 302 is also in charge of Hybrid Automatic Repeat Request (HARQ) operation. In the control plane 300, The Radio Resource Control (RRC) sublayer 306 in the L3 layer is responsible for acquiring radio resources (i.e., radio bearer) and configuring the lower layer using an RRC signaling between the gNB and the UE. The radio protocol architecture in the user plane 350 comprises the L1 layer and the L2 layer. In the user plane 350, the radio protocol architecture used for a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between Quality of Service (QoS) streams and a Data Radio Bearer (DRB), so as to support diversified traffics. The radio protocol architecture of UE in the user plane 350 may comprise all or part of protocol sublayers of a SDAP sublayer 356, a PDCP sublayer 354, a RLC sublayer 353 and a MAC sublayer 352 in L2. Although not described in FIG. 3, the UE may comprise several higher layers above the L2 355, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to a first node in the present application.

In one embodiment, the radio protocol architecture in FIG. 3 is applicable to a second node in the present application.

In one embodiment, entities of multiple sublayers of the control plane in FIG. 3 form a Signaling Radio Bearer (SRB) vertically.

In one embodiment, entities of multiple sublayers of the user plane in FIG. 3 form a DRB vertically.

In one embodiment, entities of multiple sublayers of the user plane in FIG. 3 form a multicast MRB vertically.

In one embodiment, the second message in the present application is generated by the RRC306.

In one embodiment, the first message in the present application is generated by the RRC306.

In one embodiment, the first message in the present application is generated by the MAC302 or the MAC352.

In one embodiment, the first message in the present application is generated by the PHY301 or the PHY351.

In one embodiment, the first radio signal in the present application is generated by the PHY301 or the PHY351.

In one embodiment, the at least one radio signal in the present application is generated by the PHY301 or the PHY351.

In one embodiment, the L2 305 belongs to an upper layer.

In one embodiment, the RRC sublayer 306 in the L3 belongs to an upper layer.

Embodiment 4

Figure 4:
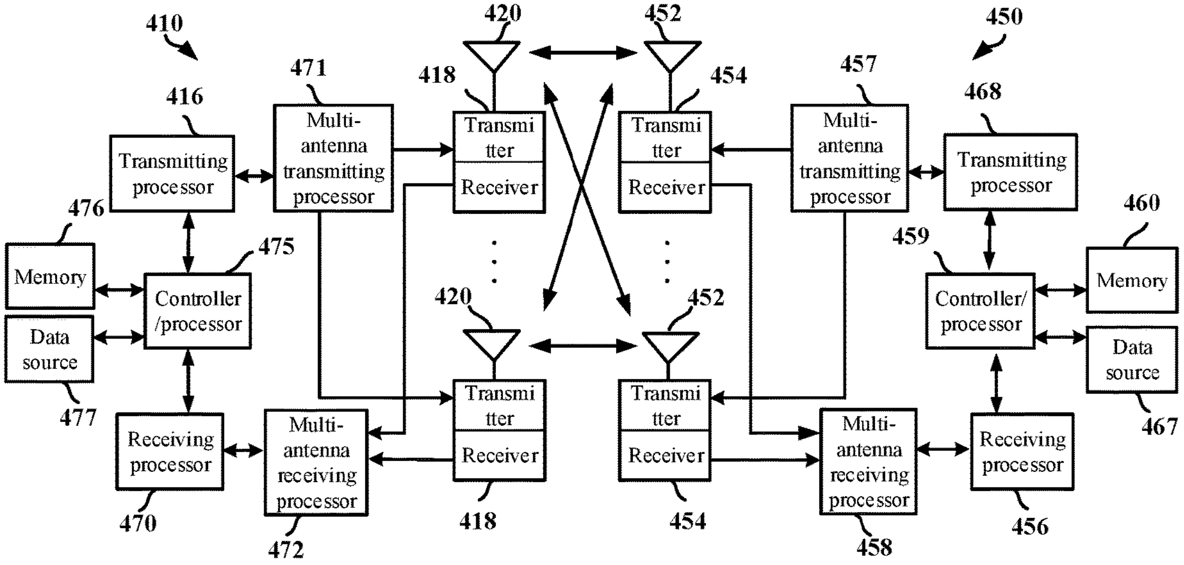
FIG. 4 illustrates a schematic diagram of hardcore modules in a communication device according to one embodiment of the present application.

Embodiment 4 illustrates a schematic diagram of hardcore modules in a communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network or from a data source 477 is provided to the controller/processor 475. The core network and data source 477 represents all protocol layers above the L2 layer. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In a transmission from the second communication device 410 to the first communication device 450, the controller/processor 459 provides de-multiplexing between a transport channel and a logical channel, packet reassembling, decrypting, header decompression, control signal processing so as to recover a higher-layer packet from the second communication device 410. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device 450. The higher-layer packet coming from the controller/processor 475 may be provided to the core network, or all protocol layers above the L2, or, various control signals can be provided to the core network or L3 for processing.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: receives a first message in RRC_Inactive state, the first message indicating a first MBS session, the first node having joined the first MBS session; and as a response to receiving the first message, enters into a first RRC state from RRC_Inactive state; and receives at least one radio signal in the first RRC state, of the at least one radio signal each radio signal comprising a data unit of the first MBS session; herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped.

In one embodiment, the first communication device 450 comprises a memory that stores a computer readable instruction program, the computer readable instruction program generates actions when executed by at least one processor, which include: receiving a first message in RRC_Inactive state, the first message indicating a first MBS session, the first node having joined the first MBS session; and as a response to receiving the first message, entering into a first RRC state from RRC_Inactive state; and receiving at least one radio signal in the first RRC state, of the at least one radio signal each radio signal comprising a data unit of the first MBS session; herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: transmits a first message, the first message indicating a first MBS session; and transmits at least one radio signal, of the at least one radio signal each radio signal comprising a data unit of the first MBS session; herein, a first node is in RRC_Inactive state, and the first node has joined the first MBS session; upon a reception of the first message, the first node enters into a first RRC state from RRC_Inactive state, and receives the at least one radio signal in the first RRC state; the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped, and the second node is a maintenance base station for the first cell.

In one embodiment, the second communication device 410 comprises a memory that stores a computer readable instruction program, the computer readable instruction program generates actions when executed by at least one processor, which include: transmitting a first message, the first message indicating a first MBS session; and transmitting at least one radio signal, of the at least one radio signal each radio signal comprising a data unit of the first MBS session; herein, a first node is in RRC_Inactive state, and the first node has joined the first MBS session; upon a reception of the first message, the first node enters into a first RRC state from RRC_Inactive state, and receives the at least one radio signal in the first RRC state; the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped, and the second node is a maintenance base station for the first cell.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a relay node.

In one embodiment, the first communication device 450 is a UE supporting V2X.

In one embodiment, the first communication device 450 is vehicle-mounted equipment.

In one embodiment, the first communication device 450 is an RSU.

In one embodiment, the first communication device 450 is a base station (gNB/eNB).

In one embodiment, the second communication device 410 is a base station (gNB/eNB).

In one embodiment, the second communication device 410 is a base station supporting V2X.

In one embodiment, the second communication device 410 is vehicle-mounted equipment.

In one embodiment, the second communication device 410 is an RSU.

In one embodiment, the second communication device 410 is a UE.

In one embodiment, the second communication device 410 is a relay node.

In one embodiment, the second communication device 410 is a UE supporting V2X.

In one embodiment, at least one of the antenna 420, the transmitter 418, the multi-antenna transmitting processor 471, the transmitting processor 416 or the controller/processor 475 is used for transmitting a second message in the present application.

In one embodiment, at least one of the antenna 452, the receiver 454, the multi-antenna receiving processor 458, the receiving processor 456 or the controller/processor 459 is used for receiving a second message in the present application.

In one embodiment, at least one of the antenna 420, the transmitter 418, the multi-antenna transmitting processor 471, the transmitting processor 416 or the controller/processor 475 is used for transmitting a first message in the present application.

In one embodiment, at least one of the antenna 452, the receiver 454, the multi-antenna receiving processor 458, the receiving processor 456 or the controller/processor 459 is used for receiving a first message in the present application.

In one embodiment, at least one of the antenna 420, the transmitter 418, the multi-antenna transmitting processor 471, the transmitting processor 416 or the controller/processor 475 is used for transmitting a first radio signal in the present application.

In one embodiment, at least one of the antenna 452, the receiver 454, the multi-antenna receiving processor 458, the receiving processor 456 or the controller/processor 459 is used for receiving a first radio signal in the present application.

In one embodiment, at least one of the antenna 420, the transmitter 418, the multi-antenna transmitting processor 471, the transmitting processor 416 or the controller/processor 475 is used for transmitting at least one radio signal in the present application.

In one embodiment, at least one of the antenna 452, the receiver 454, the multi-antenna receiving processor 458, the receiving processor 456 or the controller/processor 459 is used for receiving at least one radio signal in the present application.

Embodiment 5

Figure 5:
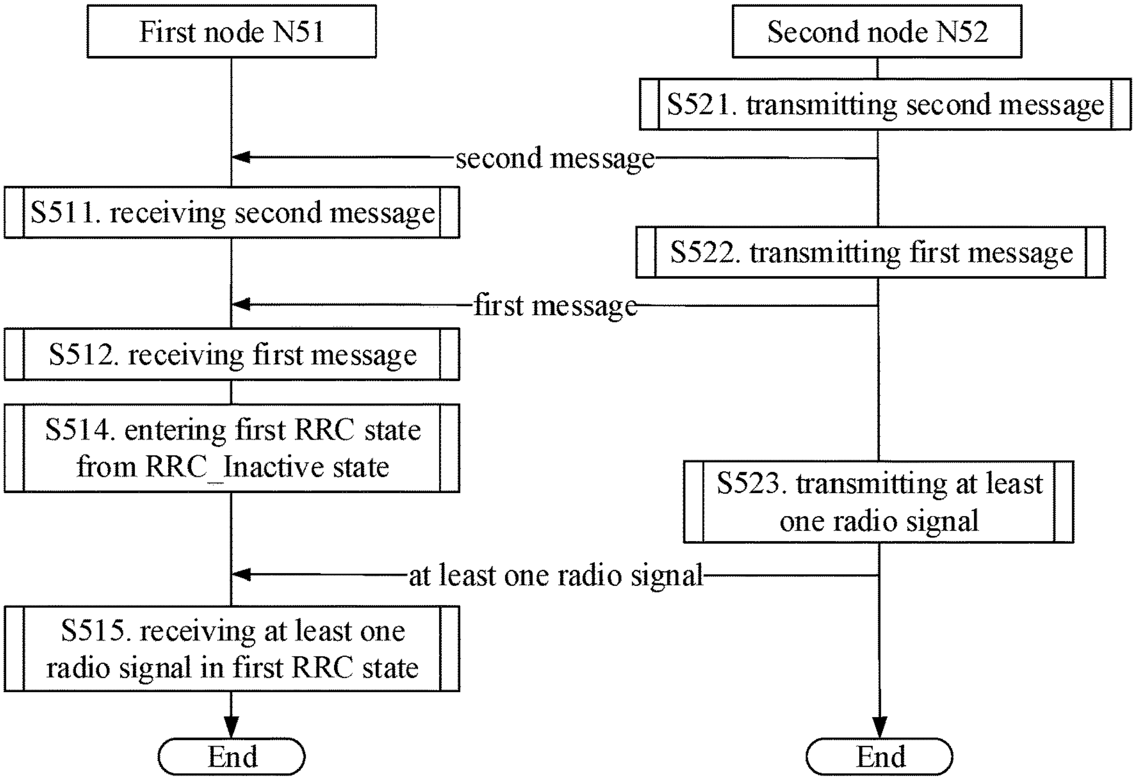
FIG. 5 illustrates a flowchart of a radio signal transmission according to one embodiment of the present application.

Embodiment 5 illustrates a flowchart of a radio signal transmission according to one embodiment of the present application, as shown in FIG. 5. In FIG. 5, a first node N51 and a second node N52 are in communication via an air interface. It should be particularly noted that the sequence illustrated herein does not set any limit to the signal transmission order or implementation order in the present application.

The first node N51 receives a second message in step S511; and receives a first message in step S512; enters into a first RRC_Connected state from RRC_Inactive state in step S513; and receives at least one radio signal in a first RRC state in step S514.

The second node N52 transmits a second message in step S521; transmits a first message in step S522; and transmits at least one radio signal in step S523.

In Embodiment 5, a first message is received in RRC_Inactive state, the first message indicating a first MBS session, the first node having joined the first MBS session; and a first processor, as a response to receiving the first message, entering into a first RRC state from RRC_Inactive state; the first receiver, receiving at least one radio signal in the first RRC state, of the at least one radio signal each radio signal comprising a data unit of the first MBS session; herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped; the phrase that whether the first RRC state is RRC_Connected state or RRC_Inactive state is related to whether there is an available configuration for the first MBS session comprises that: when the configuration for the first MBS session is not available, the first RRC state is RRC_Connected state; when the configuration for the first MBS session is available, the first RRC state is RRC_Inactive state; the first message indicates the first threshold; receiving a second message, the second message indicating the configuration for the first MBS session; herein, the configuration for the first MBS session comprises at least one of a multicast Radio Network Temporary Identity (RNTI), a DRX configuration or a semi-persistent scheduling configuration.

In one embodiment, the second node N52 is a maintenance base station for a cell on which the first node N51 is currently camped.

In one embodiment, the second node N52 is a Transmit/Receive Point (TRP) of a cell on which the first node N51 is currently camped.

In one embodiment, the second node N52 is a maintenance base station for a master cell group (MCG) of the first node N51.

In one embodiment, the second node N52 is a maintenance base station for a Secondary cell group (SCG) of the first node N51.

In one embodiment, the second node N52 is a maintenance base station for a primary cell (PCell) of the first node N51.

In one embodiment, the second node N52 is a maintenance base station for a secondary cell (SCell) of the first node N51.

In one embodiment, the second node N52 is a maintenance base station for a special cell (SpCell) of the first node N51.

In one embodiment, a second message is received through an air interface.

In one embodiment, the air interface is a Uu air interface.

In one embodiment, the air interface is a PC5 air interface.

In one embodiment, the second message is transmitted by unicast.

In one embodiment, the second message is UE-specific.

In one embodiment, the second message is transmitted by multicast.

In one embodiment, the second message is borne in a MTCH.

In one embodiment, the second message is a physical-layer message.

In one embodiment, the second message is a MAC sublayer message.

In one embodiment, the second message is a higher-layer message.

In one embodiment, the second message is an RRC layer message.

In one embodiment, the second message comprises all or part of Information Elements (IEs) in an RRC signaling.

In one embodiment, the second message comprises all or part of fields in an Information Element (IE) in an RRC signaling.

In one embodiment, the second message is a RRCReconfiguration.

In one embodiment, the second message is a RRCRelease.

In one embodiment, the second message indicates the configuration for the first MBS session.

In one embodiment, the second message comprises the configuration for the first MBS session; herein, the second message is an RRC reconfiguration message.

In one embodiment, the second message implicitly indicates that the configuration for the first MBS session is not released; herein, the second message is a RRCRelease, the second message indicating a reception of a multicast transmission in RRC_Inactive state.

In one subembodiment, the second message is used to indicate that an RRC connection is suspended.

In one subembodiment, the second message indicates at least one radio bearer, the at least one radio bearer comprising one MRB, the MRB being associated with the first MBS session.

In one subembodiment, the MRB is not activated before receiving the second message.

In one subembodiment, the MRB is suspended before receiving the second message.

In one subembodiment, the configuration for the first MBS session is received before receiving the second message.

In one embodiment, the configuration for the first MBS session comprises at least one of a multicast RNTI, a Discontinuous Reception (DRX) configuration or a semi-persistent scheduling configuration.

In one embodiment, the multicast RNTI is a Group-RNTI (G-RNTI).

In one embodiment, the multicast RNTI is a Group Configured Scheduling RNTI (G-CS-RNTI).

In one embodiment, each of the at least one radio signal is scrambled by the multicast RNTI.

In one embodiment, the DRX configuration comprises configuring a DRX-related timer for MBS multicast.

In one embodiment, the DRX configuration comprises a configuration of a timer for monitoring a Physical Downlink Control CHannel (PDCCH) scrambled by the multicast RNTI.

In one embodiment, the DRX configuration is used for MBS multicast transmission.

In one embodiment, the DRX configuration is DRX-ConfigPTM.

In one embodiment, the DRX configuration comprises at least one of a drx-onDurationTimerPTM, or a drx-SlotOffsetPTM, or a drx-InactivityTimerPTM, or a drx-LongCycleStartOffsetPTM, or a drx-RetransmissionTimerDL-PTM, or a drx-HARQ-RTT-TimerDL-PTM.

In one embodiment, the semi-persistent scheduling is configured by an RRC signaling.

In one embodiment, the semi-persistent scheduling is configured for a Serving Cell of a BandWidth Path (BWP).

In one embodiment, the semi-persistent scheduling configuration comprises the semi-persistent scheduling configuration index.

In one embodiment, the semi-persistent scheduling configuration comprises a scheduling period.

In one embodiment, the semi-persistent scheduling configuration comprises time-domain resources.

In one embodiment, the semi-persistent scheduling configuration comprises time-domain resources and frequency-domain resources.

In one embodiment, the semi-persistent scheduling configuration comprises a Hybrid Automatic Repeat Request (HARQ) process ID offset.

In one embodiment, the semi-persistent scheduling configuration comprises a HARQ process number.

In one embodiment, the semi-persistent scheduling comprises: a configured grant.

In one embodiment, the semi-persistent scheduling comprises: a configured assignment.

In one embodiment, the semi-persistent scheduling configuration is an SPS-Config.

In one embodiment, when the second message is an RRC Release, the configuration for the first MBS session comprises the first threshold.

In one embodiment, the configuration for the first MBS session comprises being used for receiving an SSB associated with a radio signal comprising a data unit of the first MBS session.

In one embodiment, the second message is transmitted in the first cell.

In one embodiment, the second message is transmitted in a cell other than the first cell.

In one embodiment, the configuration for the first MBS session is for the first cell.

In one embodiment, the configuration for the first MBS session is for a cell other than the first cell.

In one embodiment, the first message indicates the first threshold.

In one embodiment, when the channel quality of the first cell is better than the first threshold, whether the first RRC state is RRC_Connected state or RRC_Inactive state is related to whether there is an available configuration for the first MBS session.

In one embodiment, the phrase that whether the first RRC state is RRC_Connected state or RRC_Inactive state is related to whether there is an available configuration for the first MBS session comprises that: when the configuration for the first MBS session is not available, the first RRC state is RRC_Connected state.

In one embodiment, the first processor determines that the first RRC state is RRC_Connected state when the configuration for the first MBS session is not available.

In one embodiment, the phrase that whether the first RRC state is RRC_Connected state or RRC_Inactive state is related to whether there is an available configuration for the first MBS session comprises that: when the configuration for the first MBS session is available, the first RRC state is RRC_Inactive state.

In one embodiment, the first processor determines that the first RRC state is RRC_Inactive state when the configuration for the first MBS session is available.

In one embodiment, the first processor maintains RRC_Inactive state when the configuration for the first MBS session is available.

In one embodiment, when the configuration for the first MBS session is available, the first node receives the at least one radio signal while maintaining the RRC_Inactive state.

Embodiment 6

Figure 6:
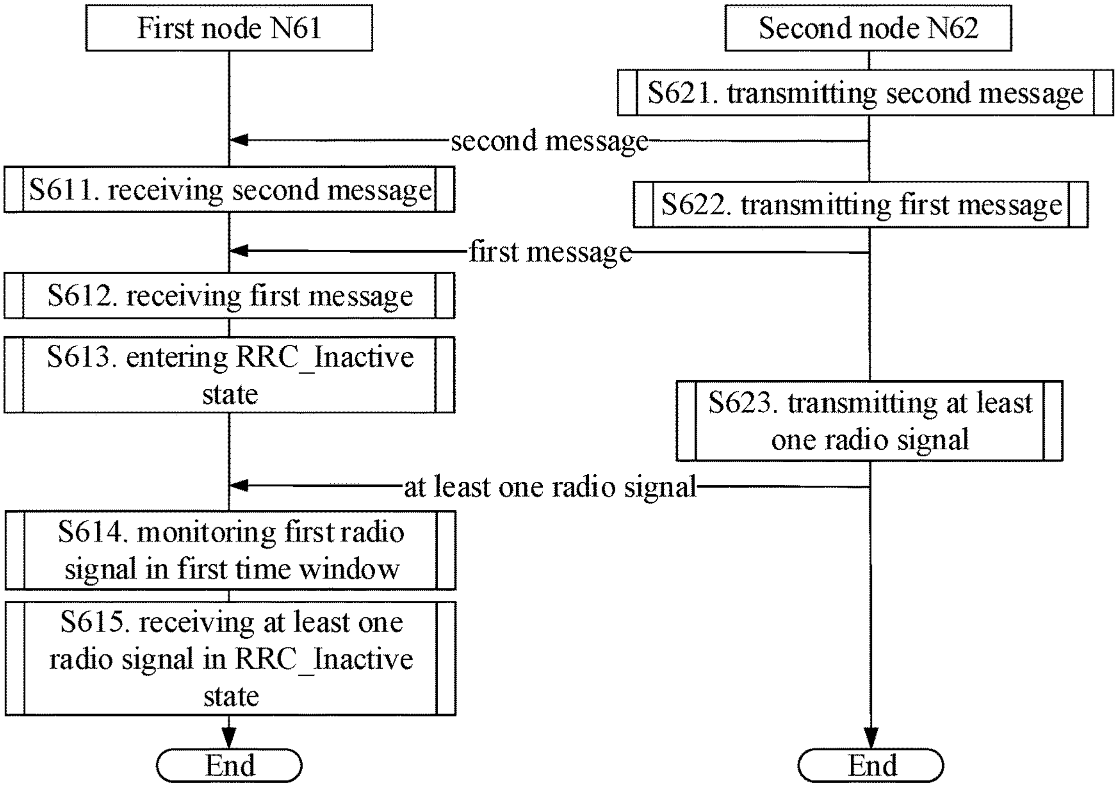
FIG. 6 illustrates another flowchart of a radio signal transmission according to one embodiment of the present application.

Embodiment 6 illustrates another flowchart of a radio signal transmission according to one embodiment of the present application, as shown in FIG. 6. In FIG. 6, a first node N61 and a second node N62 are in communication via an air interface. It should be particularly noted that the sequence illustrated herein does not set any limit to the signal transmission order or implementation order in the present application. This Embodiment is applicable to the case of monitoring a first radio signal in a first time window, the first radio signal being one of the at least one radio signal.

The first node N61 receives a second message in step S611; and receives a first message in step S612; enters into RRC_Inactive state in step S613; and monitors a first radio signal in a first time window in step S614; and receives at least one radio signal in RRC_Inactive state in step S615.

The second node N62 transmits a second message in step S621; transmits a first message in step S622; and transmits at least one radio signal in step S623.

It should be noted that the step S614 and the step S615 are presented for simpler description; the step S615 can comprise the step S614.

In one embodiment, when the configuration for the first MBS session is available, the first RRC state being RRC_Inactive state is fulfilled only when a first radio signal is monitored in a first time window.

In one embodiment, when the configuration for the first MBS session is available and a first radio signal is monitored in a first time window, the first RRC state is RRC_Inactive state.

In one embodiment, the first processor maintains the RRC_Inactive state when the first radio signal is monitored in the first time window.

In one embodiment, the first radio signal is listened over using the configuration for the first MBS session.

In one embodiment, the first radio signal is scrambled by the multicast RNTI.

In one embodiment, the phrase of monitoring a first radio signal comprises: determining whether the first radio signal exists according to a coherent detection of a characteristic sequence.

In one embodiment, the phrase of monitoring a first radio signal comprises: determining whether the first radio signal exists according to a received energy.

In one embodiment, the phrase of monitoring a first radio signal comprises: determining whether the first radio signal is received according to a Cyclic Redundancy Check (CRC) verification.

In one embodiment, the phrase of monitoring a first radio signal comprises: an operation of Blind Decoding of Downlink Control Channel (DCI).

In one embodiment, the phrase of monitoring a first radio signal comprises: Blind Decoding of DCI and decoding of the Physical Downlink Shared CHannel (PDSCH) scheduled by the PDCCH.

In one embodiment, the phrase of monitoring a first radio signal comprises: monitoring a PDCCH scrambled by the multicast RNTI.

In one embodiment, the phrase of monitoring a first radio signal comprises: receiving a PDCCH scrambled by the multicast RNTI and performing a decoding operation, if CRC determines that the decoding is correct, it is then determined that the first radio signal is monitored.

In one embodiment, the first radio signal indicates the first MBS session.

In one embodiment, the first radio signal comprises a PDCCH.

In one embodiment, the first radio signal comprises a PDCCH and a PDSCH scheduled by the PDCCH.

In one embodiment, the first radio signal comprises a PDSCH.

In one embodiment, the first radio signal is scrambled by the multicast RNTI.

In one embodiment, the first radio signal is used for activating a semi-persistent scheduling, the semi-persistent scheduling used for transmitting the first MBS session; herein, the first message is a paging message.

In one subembodiment, the first radio signal is a DCI, where a New Data Indication (NDI) field comprised by the DCI is 0, and a value of a HARQ process ID field comprised by the DCI is all-0; herein, the first node is only provided with one downlink semi-persistent scheduling in a scheduled active Downlink (DL) BWP.

In one subembodiment, the first radio signal is a DCI, where an NDI field comprised by the DCI is 0, and a value of a HARQ process ID field comprised by the DCI is the semi-persistent scheduling configuration index; herein, the first node is provided with multiple downlink semi-persistent schedulings in a scheduled active DL BandWidth Part (BWP).

In one embodiment, the scheduled active DL BWP comprises the first cell.

In one embodiment, the first radio signal comprises a data unit belonging to the first MBS session.

In one embodiment, a start of the first time window is later than a reception of the first message.

In one embodiment, the first node enters into the first RRC state after receiving the first message, the first RRC state being RRC_Inactive state; and after monitoring the first radio signal in the first time window, maintains the RRC_Inactive state for receiving a radio signal that comprises a data unit of the first MBS session.

Embodiment 7

Figure 7:
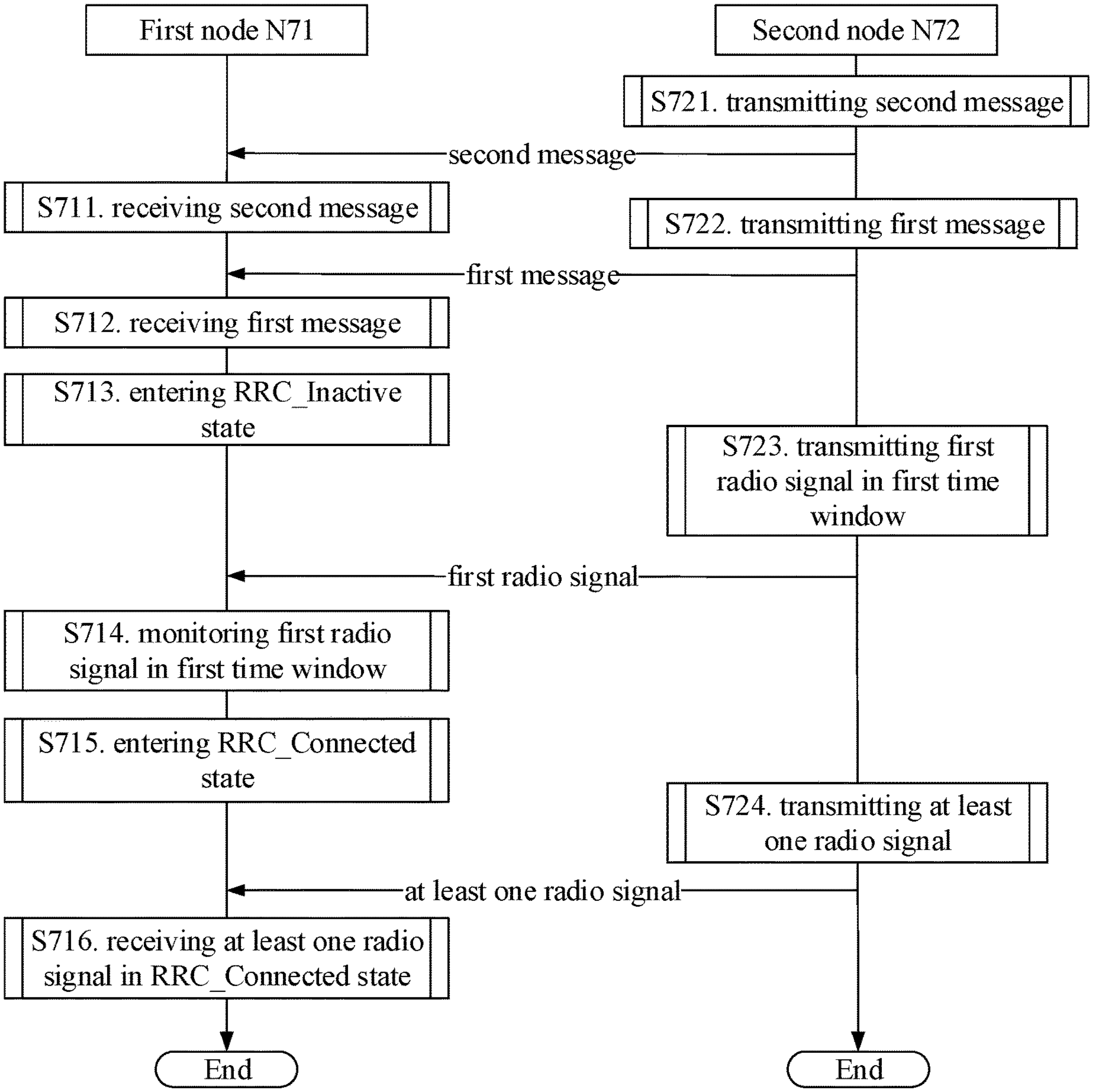
FIG. 7 illustrates a third flowchart of a radio signal transmission according to one embodiment of the present application.

Embodiment 7 illustrates a third flowchart of radio signal transmission according to one embodiment of the present application, as shown in FIG. 7. In FIG. 7, a first node N71 and a second node N72 are in communication via an air interface. It should be particularly noted that the sequence illustrated herein does not set any limit to the signal transmission order or implementation order in the present application. This Embodiment is applicable to the case where a first radio signal is not monitored in a first time window; a transmission of the first radio signal is earlier than a transmission of the at least one radio signal.

The first node N71 receives a second message in step S711; and receives a first message in step S712; enters into RRC_Inactive state in step S713; and monitors a first radio signal in a first time window in step S714; enters into RRC_Connected state in step S715; and receives at least one radio signal in RRC_Connected state in step S716.

The second node N72 transmits a second message in step S721; transmits a first message in step S722; and transmits a first radio signal in a first time window in step S723; and transmits at least one radio signal in step S724.

In one embodiment, the first node maintains RRC_Inactive state after having received the first message, with the first radio signal not being monitored in the first time window, the first node enters into a first RRC state and receives the at least one radio signal in the first RRC state, the first RRC state being RRC_Connected state.

In one embodiment, the action of entering into the first RRC state from RRC_Inactive state in response to the first message goes through an interval of at least a length of the first time window.

In one embodiment, the first processor transits from the RRC_Inactive state to the RRC_Connected state when not having monitored the first radio signal in the first time window.

In one embodiment, the first processor initiates a random access procedure for RRC connection resume in a first random access resource set after the first time window when not having monitored the first radio signal in the first time window.

In one embodiment, when the configuration for the first MBS session is available, and the first radio signal is not monitored in the first time window, firstly enter into RRC_IDLE state from the RRC_Inactive state and then enter into RRC_Connected state from the RRC_IDLE state.

In one subembodiment, the at least one radio signal is received in RRC_Connected state.

In one embodiment, the phrase of firstly entering into RRC_Idle state from the RRC_Inactive state comprises: releasing the configuration for the first MBS session.

In one embodiment, the phrase of firstly entering into RRC_Idle state from the RRC_Inactive state and then entering RRC_Connected state from the RRC_Idle state comprises: releasing a stored configuration for the first MBS session and then obtaining an updated configuration for the first MBS session from the second node.

In one embodiment, the first node enters RRC_Connected state from the RRC_Inactive state, and receives the at least one radio signal in the RRC_Connected state.

In one embodiment, the first node receives the at least one radio signal after having received the first message and gone through a time interval as long as the first time window.

In one embodiment, the first node does not monitor a PDCCH scrambled by the multicast RNTI in the first time window after having received the first message.

In one embodiment, the first node does not monitor a radio signal comprising a data unit of the first MBS session in the first time window after having received the first message.

Embodiment 8

Figure 8:
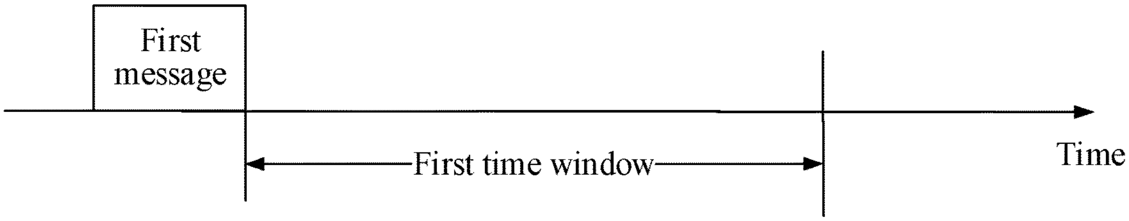
FIG. 8 illustrates a schematic diagram of a first message and a first time window according to one embodiment of the present application.

Embodiment 8 illustrates a schematic diagram of a first message and a first time window according to one embodiment of the present application, as shown in FIG. 8.

In one embodiment, a length of the first time window is configured by the network.

In one embodiment, the length of the first time window is determined by the first node itself.

In one embodiment, the length of the first time window is configured by a SIB.

In one embodiment, a length of the first time window is greater than a length of a semi-persistent scheduling period comprised by the semi-persistent scheduling configuration.

In one embodiment, the first time window is contiguous in time domain.

In one embodiment, the first time window is non-contiguous in time domain.

In one embodiment, time-domain resources comprised by the first time window are reserved for a Uu air interface.

In one embodiment, a start of the first time window is an end time of receiving the first message.

In one embodiment, a start of the first time window is a start time of a first symbol following a reception of the first message.

In one embodiment, a start of the first time window is a start time of a first slot following a reception of the first message.

In one embodiment, a start of the first time window is a start time of a first subframe following a reception of the first message.

In one embodiment, the first time window comprises a duration of at least one symbol.

In one embodiment, the first time window comprises a duration of at least one slot.

In one embodiment, the first time window comprises a duration of at least one subframe.

In one embodiment, the first time window comprises Q1 millisecond(s), where Q1 is a positive integer.

The figure of Embodiment 8 depicts the case in which the first time window is contiguous in time domain.

Embodiment 9

Figures 9, 10:
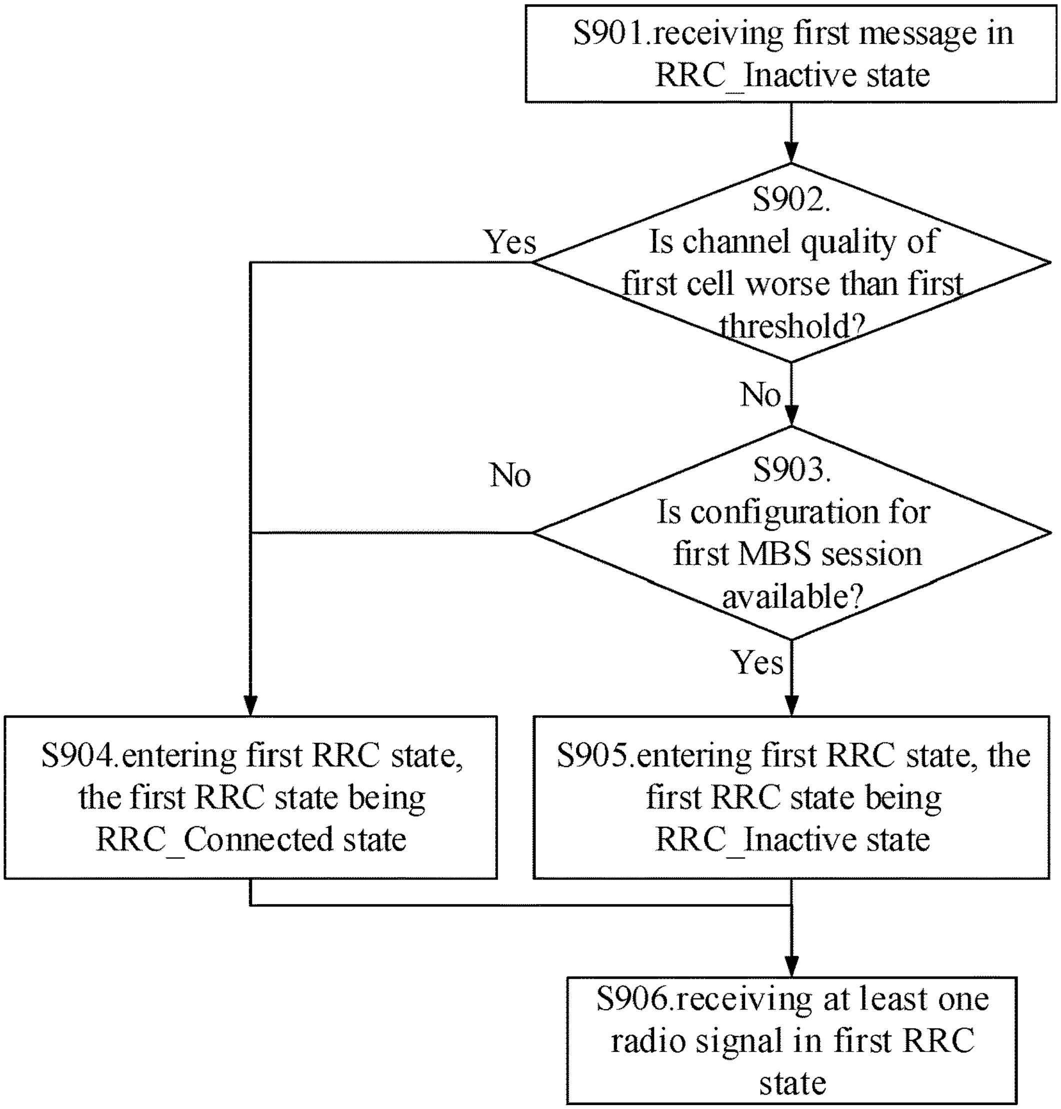
FIG. 9 illustrates a schematic diagram of signal processing in a first node according to one embodiment of the present application.
FIG. 10 illustrates a schematic diagram of the structure of a first message according to one embodiment of the present application.

Embodiment 9 illustrates a schematic diagram of signal processing in a first node according to one embodiment of the present application, as shown in FIG. 9.

In Embodiment 9: receiving a first message in RRC_Inactive state in step S901; determining in step S902 whether channel quality of a first cell is worse than a first threshold, if so, performing step S904, if not, performing step S903; determining in step S903 whether a configuration for the first MBS session is available, if not, performing step S904, if so, performing step S905; entering a first RRC state in step S904, where the first RRC state is RRC_Connected state; entering a first RRC state in step S905, where the first RRC state is RRC_Inactive state; and receiving at least one radio signal in the first RRC state in step S906.

Embodiment 10

Embodiment 10 illustrates a schematic diagram of the structure of a first message according to one embodiment of the present application, as shown in FIG. 10. The first message is a paging message.

In one embodiment, the first message explicitly indicates the first threshold.

In one embodiment, the first message comprises the first threshold.

In one embodiment, the first message implicitly indicates the first threshold.

In one embodiment, the first message indicates a first index, the first index indicating an item in a first table, where a value in the item is the first threshold.

In one subembodiment, the first table is network-configured.

In one subembodiment, the first table is pre-configured.

In one subembodiment, the first table is configured through a system message.

In one subembodiment, the first table is specified.

The figure of Embodiment 10 comprises an IE in a paging message, the IE being a PagingGroupList, the PagingGroupList comprising at least one PagingGroupRecord, of which each PagingGroupRecord comprises {group-Identity, rsrp-thresholdMBS}, where the rsrp-thresholdMBS is optional; the group-Identity in the first message indicates the first identifier, while the rsrp-thresholdMBS in the first message indicates the first threshold.

In one embodiment, when the first message comprises the first threshold, the first node determines whether the first RRC state is RRC_Connected state or RRC_Inactive state according to a relative magnitude of the channel quality of the first cell and the first threshold indicated by the first message.

In one embodiment, when the first message does not comprise the first threshold, the first node determines whether the first RRC state is RRC_Connected state or RRC_Inactive state according to a relative magnitude of the channel quality of the first cell and the first threshold determined by the first node itself.

In one embodiment, when the first message does not comprise the first threshold, the first RRC state is RRC_Connected state.

Embodiment 11

Figure 11:
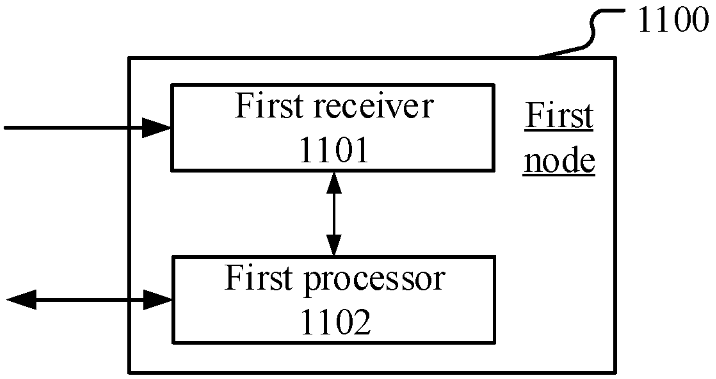
FIG. 11 illustrates a structure block diagram of a processing device in a first node according to one embodiment of the present application.

Embodiment 11 illustrates a structure block diagram of a processing device in a first node according to one embodiment of the present application, as shown in FIG. 11. In FIG. 11, a processing device in a first node 1100 is comprised of a first receiver 1101 and a first processor 1102; The first node 1100 is a UE.

In Embodiment 11, the first receiver 1101 receives a first message in RRC_Inactive state, the first message indicating a first MBS session, the first node having joined the first MBS session; and the first processor 1102, as a response to receiving the first message, enters into a first RRC state from RRC_Inactive state; the first receiver 1101 receives at least one radio signal in the first RRC state, of the at least one radio signal each radio signal comprising a data unit of the first MBS session; herein, the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped.

In one embodiment, the phrase that whether the first RRC state is RRC_Connected state or RRC_Inactive state is related to whether there is an available configuration for the first MBS session comprises that: when the configuration for the first MBS session is not available, the first RRC state is RRC_Connected state; when the configuration for the first MBS session is available, the first RRC state is RRC_Inactive state.

In one embodiment, when the configuration for the first MBS session is available, the first RRC state being RRC_Inactive state is fulfilled only when a first radio signal is monitored in a first time window; herein, the first radio signal indicates the first MBS session; a start of the first time window is later than a reception of the first message.

In one embodiment, when the configuration for the first MBS session is available, the first RRC state being RRC_Inactive state is fulfilled only when a first radio signal is monitored in a first time window; herein, the first radio signal indicates the first MBS session; a start of the first time window is later than a reception of the first message; when the configuration for the first MBS session is available, and the first radio signal is not monitored in the first time window, the first RRC state is RRC_Connected state.

In one embodiment, when the configuration for the first MBS session is available, the first RRC state being RRC_Inactive state is fulfilled only when a first radio signal is monitored in a first time window; herein, the first radio signal indicates the first MBS session; a start of the first time window is later than a reception of the first message; a length of the first time window is network-configured, or the length of the first time window is determined by the first node itself.

In one embodiment, the first message indicates the first threshold.

In one embodiment, the first receiver 1101 receives a second message, the second message indicating the configuration for the first MBS session; herein, the configuration for the first MBS session comprises at least one of a multicast Radio Network Temporary Identity (RNTI), a DRX configuration or a semi-persistent scheduling configuration.

In one embodiment, the first receiver 1101 comprises the receiver 454 (comprising the antenna 452), the receiving processor 456, the multi-antenna receiving processor 458 and the controller/processor 459 in FIG. 4 of the present application.

In one embodiment, the first receiver 1101 comprises at least one of the receiver 454 (comprising the antenna 452), the receiving processor 456, the multi-antenna receiving processor 458 or the controller/processor 459 in FIG. 4 of the present application.

In one embodiment, the first processor 1102 comprises the controller/processor 459 in FIG. 4 of the present application.

In one embodiment, the first processor 1102 comprises at least one of the receiver 454 (comprising the antenna 452), the receiving processor 456, the multi-antenna receiving processor 458 or the controller/processor 459 in FIG. 4 of the present application.

In one embodiment, the first processor 1102 comprises at least one of the transmitter 454 (comprising the antenna 452), the transmitting processor 468, the multi-antenna transmitting processor 457 or the controller/processor 459 in FIG. 4 of the present application.

Embodiment 12

Figure 12:
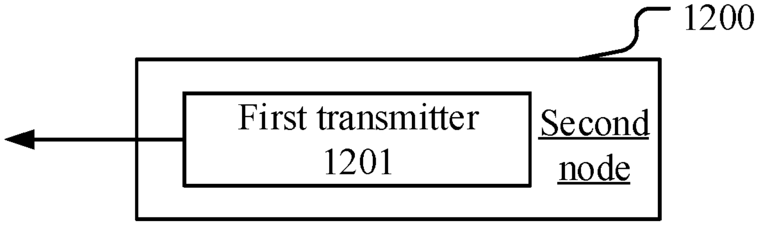
FIG. 12 illustrates a structure block diagram of a processing device in a second node according to one embodiment of the present application.

Embodiment 12 illustrates a structure block diagram of a processing device in a second node according to one embodiment of the present application, as shown in FIG. 12. In FIG. 12, a processing device 1200 in a second node comprises a first transmitter 1201; the second node 1200 is a base station.

In Embodiment 12, the first transmitter 1201 transmits a first message, the first message indicating a first MBS session; and transmits at least one radio signal, of the at least one radio signal each radio signal comprising a data unit of the first MBS session; herein, a first node is in RRC_Inactive state, and the first node has joined the first MBS session; upon a reception of the first message, the first node enters into a first RRC state from RRC_Inactive state, and receives the at least one radio signal in the first RRC state; the first RRC state is one of RRC_Connected state or RRC_Inactive state; whether the first RRC state is RRC_Connected state or RRC_Inactive state is related to at least channel quality of a first cell; when the channel quality of the first cell is worse than a first threshold, the first RRC state is RRC_Connected state; when the channel quality of the first cell is better than the first threshold, whether the first RRC state is RRC_Connected state or RRC_Inactive state is related to whether there is an available configuration for the first MBS session; the first cell is a cell on which the first node is currently camped, and the second node is a maintenance base station for the first cell.

In one embodiment, the phrase that whether the first RRC state is RRC_Connected state or RRC_Inactive state is related to whether there is an available configuration for the first MBS session comprises that: when the configuration for the first MBS session is not available, the first RRC state is RRC_Connected state; when the configuration for the first MBS session is available, the first RRC state is RRC_Inactive state.

In one embodiment, when the configuration for the first MBS session is available, the first RRC state being RRC_Inactive state is fulfilled only when a first radio signal is monitored in a first time window; herein, the first radio signal indicates the first MBS session; a start of the first time window is later than a reception of the first message.

In one embodiment, when the configuration for the first MBS session is available, the first RRC state being RRC_Inactive state is fulfilled only when a first radio signal is monitored in a first time window; herein, the first radio signal indicates the first MBS session; a start of the first time window is later than a reception of the first message; when the configuration for the first MBS session is available, and the first radio signal is not monitored in the first time window, the first RRC state is RRC_Connected state.

In one embodiment, when the configuration for the first MBS session is available, the first RRC state being RRC_Inactive state is fulfilled only when a first radio signal is monitored in a first time window; herein, the first radio signal indicates the first MBS session; a start of the first time window is later than a reception of the first message; a length of the first time window is network-configured, or the length of the first time window is determined by the first node itself.

In one embodiment, the first message indicates the first threshold.

In one embodiment, the first transmitter 1201 transmits a second message, the second message indicating the configuration for the first MBS session; herein, the configuration for the first MBS session comprises at least one of a multicast Radio Network Temporary Identity (RNTI), a DRX configuration or a semi-persistent scheduling configuration.

In one embodiment, the first transmitter 1201 comprises the transmitter 418 (comprising the antenna 420), the transmitting processor 416, the multi-antenna transmitting processor 471 and the controller/processor 475 in FIG. 4 of the present application.

In one embodiment, the first transmitter 1201 comprises at least one of the transmitter 418 (comprising the antenna 420), the transmitting processor 416, the multi-antenna transmitting processor 471 or the controller/processor 475 in FIG. 4 of the present application.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first-type communication node or UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second-type communication node or base station or network-side device in the present application includes but is not limited to macro-cellular base stations, micro-cellular base stations, home base stations, relay base station, eNB, gNB, Transmitter Receiver Point (TRP), relay satellite, satellite base station, airborne base station, test equipment like transceiving device simulating partial functions of base station or signaling tester and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communication, the UE comprising:

a transceiver; and a processor, wherein the transceiver and the processor are configured to:

receive, in a radio resource control (RRC) inactive state, a message indicating a multicast and broadcast service (MBS) session joined by the UE;

on a condition that a channel quality of a cell is less than a threshold, switch to an RRC connected state; and on a condition that the channel quality of the cell is more than the threshold and a configuration for the MBS session is available, maintain the RRC inactive state; and on a condition that the channel quality of the cell is more than the threshold and the configuration for the MBS session is unavailable, switch to the RRC connected state.

2. The UE according to claim 1, wherein the threshold is one of: system-configured, preconfigured, determined by the UE, or indicated by the message.

3. The UE according to claim 2, wherein the transceiver and the processor are further configured to:

on a condition that the configuration for the MBS session is available, switch to the RRC inactive state based on radio signal monitored in a time window after reception of the first message.

4. The UE according to claim 3, wherein the transceiver and the processor are further configured to:

on a condition that the configuration for the MBS session is available and the radio signal is not monitored in the time window, switch to the RRC connected state.

5. The UE according to claim 3, wherein a length of the time window is network-configured or determined by the UE.

6. The UE according to claim 1, wherein the transceiver and the processor are further configured to:

receive the configuration for the MBS session comprising at least one of a multicast radio network temporary identity (RNTI), a discontinuous reception (DRX) configuration, or a semi-persistent scheduling configuration.

7. A base station for wireless communications, the base station comprising:

a transceiver; and a processor, wherein the transceiver and the processor are configured to:

transmit a message indicating a multicast and broadcast service (MBS) session; and transmit at least one radio signal comprising a data unit of the MBS session, wherein a user equipment (UE) selects and enters a radio resource control (RRC) state to receive a radio signal, and wherein:

on a condition that a channel quality of a cell is less than a threshold, the selected RRC state is an RRC connected state; and on a condition that the channel quality of the cell is more than the threshold and a configuration for the MBS session is available, the selected RRC state is an RRC inactive state; and on a condition that the channel quality of the cell is more than the threshold and the configuration for the MBS session is unavailable, the selected RRC state is the RRC connected state.

8. The base station according to claim 7, wherein the threshold is one of: system-configured, preconfigured, determined by the UE, or indicated by the message.

9. The base station according to claim 8, wherein on a condition that the configuration for the MBS session is available, the RRC inactive state is selected based on a radio signal monitored in a time window after reception of the message.

10. The base station according to claim 9, wherein on a condition that the configuration for the MBS session is available and the radio signal is not monitored in the time window, the selected state is the RRC connected state.

11. The base station according to claim 9, wherein a length of the time window is network-configured or determined by the first UE.

12. The base station according to claim 7, wherein the transceiver and the processor are further configured to:

transmit the configuration for the MBS session comprising at least one of a multicast radio network temporary identity (RNTI), a discontinuous reception (DRX) configuration, or a semi-persistent scheduling configuration.

13. A method in a user equipment (UE) for wireless communications, the method comprising:

receiving, in a radio resource control (RRC) inactive state, a message indicating a multicast and broadcast service (MBS) session joined by the UE;

on a condition that a channel quality of a cell is less than a threshold, switching to an RRC connected state; and on a condition that the channel quality of the cell is more than the threshold and a configuration for the MBS session is available, maintaining the RRC inactive state; and on a condition that the channel quality of the cell is more than the threshold and the configuration for the MBS session is unavailable, switching to the RRC connected state.

14. The method in the UE according to claim 13, wherein the threshold is one of: system-configured, preconfigured, determined by the UE, or indicated by the message.

15. The method in the UE according to claim 14, further comprising:

on a condition that the configuration for the MBS session is available, switching to the RRC inactive state based on a radio signal monitored in a time window after a reception of the message.

16. The method in the UE according to claim 15, further comprising:

on a condition that the MBS session is available and the radio signal is not monitored in the time window, switching to the RRC_connected state.

17. The method in the UE according to claim 15, wherein a length of the time window is network-configured or determined by the UE.

18. The method in the UE according to claim 13, further comprising:

receiving the configuration for the MBS session comprising at least one of a multicast radio network temporary identity (RNTI), a discontinuous reception (DRX) configuration, or a semi-persistent scheduling configuration.

* * * * *